(12) United States Patent
Dolby et al.

(10) Patent No.: US 12,360,792 B2
(45) Date of Patent: Jul. 15, 2025

(54) SAFELY PROCESSING INTEGRATED FLOWS OF MESSAGES IN A MULTI-TENANT CONTAINER

(71) Applicant: International Business Machines Corporation, Armonk, NY (US)

(72) Inventors: Trevor Clifford Dolby, Southampton (GB); John Anthony Reeve, Winchester (GB); Andrew John Coleman, Petersfield (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 16/738,760

(22) Filed: Jan. 9, 2020

(65) Prior Publication Data

US 2021/0216343 A1 Jul. 15, 2021

(51) Int. Cl.
*G06F 21/53* (2013.01)
*G06F 9/455* (2018.01)
(Continued)

(52) U.S. Cl.
CPC .......... *G06F 9/45558* (2013.01); *G06F 9/546* (2013.01); *G06F 11/3006* (2013.01);
(Continued)

(58) Field of Classification Search
CPC .. G06F 9/45558; G06F 9/546; G06F 11/3006; G06F 21/121; G06F 21/53;
(Continued)

(56) References Cited

U.S. PATENT DOCUMENTS

| 8,752,017 B2 | 6/2014 | Hossain et al. |
| 9,754,122 B1 * | 9/2017 | Christopher ........ G06F 21/6218 |

(Continued)

FOREIGN PATENT DOCUMENTS

| CN | 105323282 A | 2/2016 |
| CN | 107689953 A | 2/2018 |

(Continued)

OTHER PUBLICATIONS

"A method for Enabling Multi-Tenancy for Single-Tenancy Java Applications," IP.com, IPCOM000188617D, Oct. 15, 2009, pp. 1-7, see Abstract.

(Continued)

*Primary Examiner* — Trong H Nguyen
(74) *Attorney, Agent, or Firm* — Shackelford, McKinley & Norton, LLP; Robert A. Voigt, Jr.

(57) ABSTRACT

A computer-implemented method, system and computer program product for safely processing integrated flows of messages in a multi-tenant container. Each step in the flows of messages to be processed by the applications in the multi-tenant container is monitored. If the monitored step is determined to run custom logic in a general-purpose programming language, then the flow of messages running such custom logic is suspended from being processed by the application in the container if there are other flows of messages being processed by other applications in the container. Furthermore, new flows of messages are prevented from being processed by the applications in the container. After processing the other flows of messages by the other applications in the container, the suspended flow of messages is now processed by the application in the container. In this manner, the risk of interference with other flows of messages in the container is avoided.

14 Claims, 8 Drawing Sheets

(51) Int. Cl.
*G06F 9/54* (2006.01)
*G06F 11/30* (2006.01)
*G06F 21/12* (2013.01)
*G06F 21/56* (2013.01)

(52) U.S. Cl.
CPC ............ *G06F 21/121* (2013.01); *G06F 21/53* (2013.01); *G06F 21/566* (2013.01); *G06F 2009/45591* (2013.01); *G06F 2009/45595* (2013.01)

(58) Field of Classification Search
CPC ......... G06F 21/566; G06F 2009/45591; G06F 2009/45595; G06F 11/301; G06F 11/3055; G06F 11/302
See application file for complete search history.

(56) References Cited

U.S. PATENT DOCUMENTS

| | | | |
|---|---|---|---|
| 9,772,835 B1 * | 9/2017 | Trautmann | G06F 9/547 |
| 10,025,924 B1 | 7/2018 | Vagin et al. | |
| 2015/0277995 A1 * | 10/2015 | Raju | G06F 9/544 |
| | | | 719/313 |
| 2016/0099915 A1 | 4/2016 | Savelieva et al. | |
| 2016/0239343 A1 * | 8/2016 | Holt | G06F 9/45558 |
| 2018/0083826 A1 | 3/2018 | Wilson et al. | |
| 2018/0137296 A1 | 5/2018 | Cahana et al. | |
| 2019/0018953 A1 * | 1/2019 | Totale | G06F 21/53 |
| 2019/0068536 A1 * | 2/2019 | Gambino | H04L 67/10 |
| 2019/0109893 A1 * | 4/2019 | Gagliardi | H04L 51/226 |
| 2019/0132220 A1 * | 5/2019 | Boutros | H04L 41/5041 |
| 2020/0097310 A1 * | 3/2020 | Shukla | G06F 9/5072 |
| 2020/0259923 A1 * | 8/2020 | DeArment | H04L 67/10 |
| 2020/0301732 A1 * | 9/2020 | Takumi | G06F 9/4831 |
| 2021/0105317 A1 * | 4/2021 | Kona | G06F 9/505 |

FOREIGN PATENT DOCUMENTS

| | | |
|---|---|---|
| CN | 109565511 A | 4/2019 |
| CN | 114930788 A | 8/2022 |
| DE | 112020005362 T5 | 10/2022 |
| GB | 2607480 A | 12/2022 |
| JP | 2017-539015 A | 12/2017 |
| JP | 2019-517694 A | 6/2019 |
| JP | 7501983 B2 | 6/2024 |
| WO | 2016086111 A1 | 6/2016 |
| WO | 2017210065 A1 | 12/2017 |
| WO | 2021/140397 A1 | 7/2021 |

OTHER PUBLICATIONS

"Method and System for Relating Resource Isolation Opportunity to a Running Virtual Machine Isolation Decision," IP.com, IPCOM000231139D, Sep. 30, 2013, pp. 1-2, see Abstract.

Office Action for Chinese Application No. 2020800913850 dated Nov. 30, 2023, pp. 1-6.

Decision to Grant a Patent for Japanese Patent Application No. 2022-541664 dated May 10, 2024, pp. 1-2.

Office Action for Chinese Patent Application No. 202080091385.0 dated Jun. 29, 2024, pp. 1-4.

Notice of Grant Patent Right for Chinese Patent Application No. 202080091385.0 issued on Aug. 26, 2024, pp. 1-2.

International Searching Authority, "International Search Report and Written Opinion," Patent Cooperation Treaty, Apr. 9, 2021, 7 pages, International Application No. PCT/IB2020/062284.

* cited by examiner

SAFELY PROCESSING INTEGRATED FLOWS OF MESSAGES IN A MULTI-TENANT CONTAINER

TECHNICAL FIELD

The embodiments of the present invention relate generally to multi-tenant environments, and more particularly to safely processing integrated flows of messages in a multi-tenant container.

BACKGROUND

Multi-tenant environments involve multiple tenants (e.g., groups of users) being serviced by a single instance of software running on a server. A tenant is a group of users who share a common access with specific privileges to the software instance. With a multi-tenant architecture, a software application is designed to provide every tenant a dedicated share of the instance—including its data, configuration, user management, tenant individual functionality and non-functional properties. As a result, the resources being utilized by the tenants may be shared across the tenants. For example, the same resources may be utilized by multiple different tenants, which is commonly referred to as "multi-tenant provisioning." That is, "multi-tenant provisioning" refers to the allocation of resources to be shared among different tenants.

SUMMARY

In one embodiment of the present invention, a computer-implemented method for safely processing integrated flows of messages in a multi-tenant container comprises monitoring each step in a plurality of flows of messages to be processed by a plurality of applications in the multi-tenant container, where the multi-tenant container stores applications processing flows of messages for multiple tenants. The method further comprises determining whether each step in the plurality of flows of messages runs custom logic in a general-purpose programming language. The method additionally comprises suspending a flow of messages from being processed by an application in the multi-tenant container in response to detecting the flow of messages running custom logic in the general-purpose programming language and in response to other flows of messages being processed by other applications in the multi-tenant container. Furthermore, the method comprises preventing new flows of messages to be processed by applications in the multi-tenant container in response to suspending the flow of messages from being processed by the application in the multi-tenant container. Additionally, the method comprises processing the suspended flow of messages by the application in the multi-tenant container after processing of the other flows of messages by the other applications in the multi-tenant container has completed.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the embodiments of the present invention will be described hereinafter which may form the subject of the claims of the present invention.

BRIEF DESCRIPTION OF THE DRAWINGS

A better understanding of the embodiments of the present invention can be obtained when the following detailed description is considered in conjunction with the following drawings, in which.

DETAILED DESCRIPTION

As stated in the Background section, multi-tenant environments involve multiple tenants (e.g., groups of users) being serviced by a single instance of software running on a server. A tenant is a group of users who share a common access with specific privileges to the software instance. With a multi-tenant architecture, a software application is designed to provide every tenant a dedicated share of the instance—including its data, configuration, user management, tenant individual functionality and non-functional properties. As a result, the resources being utilized by the tenants may be shared across the tenants. For example, the same resources may be utilized by multiple different tenants, which is commonly referred to as "multi-tenant provisioning." That is, "multi-tenant provisioning" refers to the allocation of resources to be shared among different tenants.

In connection with multi-tenant provisioning, the flows of messages to be processed on behalf of different tenants may be processed by an application within the same container. Such flows of messages are said to be "integrated" since they are to be processed by an application within the same container.

A "container," as used herein, refers to an isolated user-space instance. For example, operating system-level virtualization is an operating system paradigm in which the kernel allows the existence of multiple isolated user-space instances, where such instances are called "containers." Such containers may look like real computers from the point of view of programs running in them. A computer program running on an ordinary operating system can see all resources (e.g., connected devices, files and folders, network shares, CPU power, quantifiable hardware capabilities) of that computer. However, computer programs running inside of a container can only see the container's contents and devices assigned to the container.

By processing different flows of messages on behalf of different tenants within the same container, there may result an untoward influence on the processing of another flow of messages for a different tenant.

For example, in multi-tenant environments, complicated logic may be required to handle cases, such as error handling, involving custom logic in a general-purpose programming language (e.g., code written in Java®). For example, in error handling, custom compensation or recovery logic often requires general-purpose programming language support. A general-purpose programming language (also referred to as a "generic-application programming language"), as used herein, refers to a programming language commonly used in computer programming, such as Java®. Unfortunately, such general-purpose programming languages can be potentially misused to spy upon or otherwise influence unrelated integrated flows of messages involving different tenants.

Currently, such situations can be avoided by utilizing a different container for each tenant. However, while such a structure is secure, it does not allow the sharing of resources across a large set of tenants, and therefore, is expensive to implement.

Alternatively, some multi-tenant environments prevent the use of general-purpose programming languages to address the situation described above. However, by preventing the use of such general-purpose programming languages, the multi-tenant environment may not meet the functional requirements of many tenants.

As a result, there is not currently a means for enabling the integration of flows of messages that allow the sharing of resources, such as containers, across multiple tenants while also being secure, such as by not affecting the other integrated flows of messages from other tenants.

The embodiments of the present invention provide a means for safely processing the integrated flows of messages in a multi-tenant environment as discussed further below.

In some embodiments, the present invention comprises a computer-implemented method, system and computer program product for safely processing integrated flows of messages in a multi-tenant container. In one embodiment of the present invention, each step in the flows of messages to be processed by the applications in the multi-tenant container is monitored, where the multi-tenant container stores applications for processing the flows of messages for multiple tenants. Each step in the flow of messages is monitored to determine whether the step runs custom logic in a general-purpose programming language. If the monitored step is determined to run custom logic in a general-purpose programming language, then the flow of messages running custom logic in the general-purpose programming language is suspended from being processed by the application in the multi-tenant container if there are other flows of messages being processed by other applications in the multi-tenant container. Furthermore, new flows of messages are prevented from being processed by the applications in the multi-tenant container. After processing the other flows of messages by the other applications in the multi-tenant container, the suspended flow of messages is now processed by the application in the multi-tenant container. In this manner, the flows of messages from different tenants are integrated so as to allow the sharing of resources, such as a container, while also being secure, such as by not affecting the other integrated flows of messages from other tenants.

In the following description, numerous specific details are set forth to provide a thorough understanding of the embodiments of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
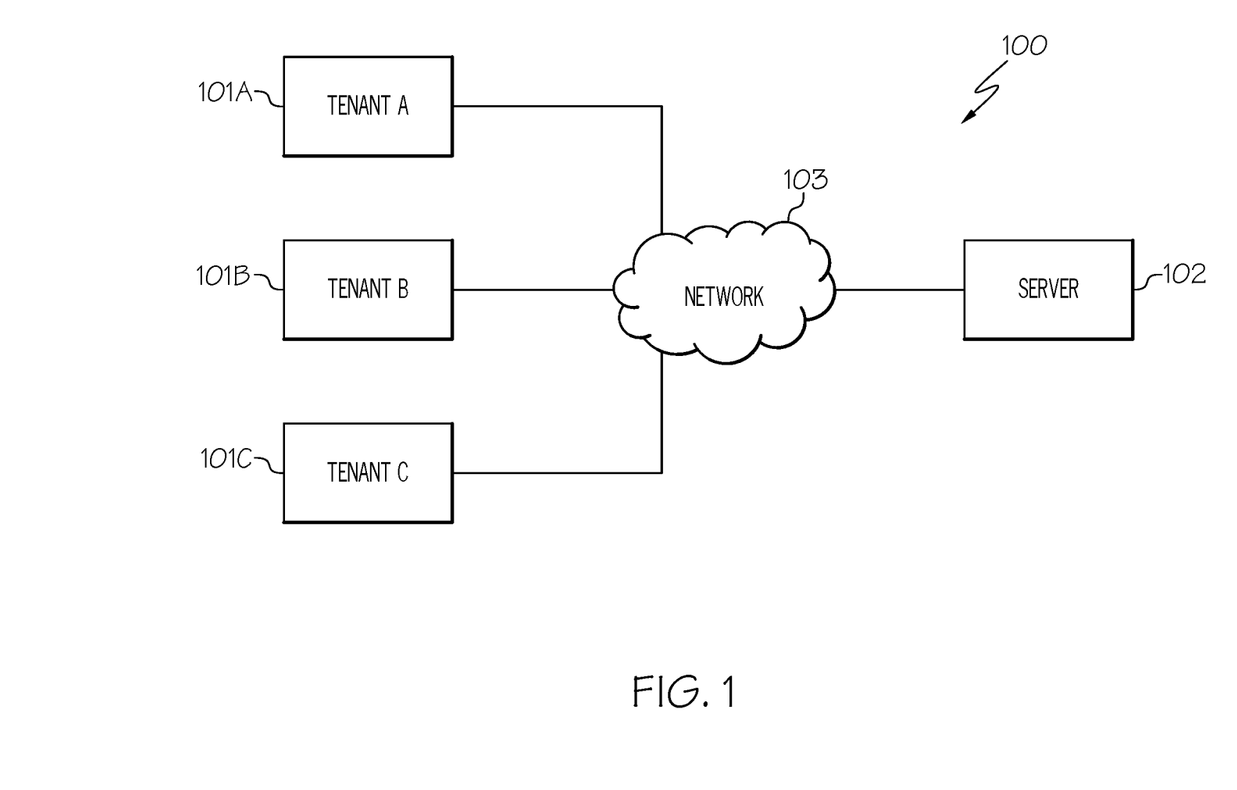
FIG. 1 illustrates a multi-tenant environment in accordance with an embodiment of the present invention.

Referring now to the Figures in detail, FIG. 1 illustrates a multi-tenant environment 100 in accordance with an embodiment of the present invention. Environment 100 includes tenants 101A-101C (identified as "Tenant A," "Tenant B," and "Tenant C," respectively) connected to a server 102 via a network 103. Tenants 101A-101C may collectively or individually be referred to as tenants 101 or tenant 101, respectively. A tenant 101, as used herein, refers to the computing devices utilized by a group of users, including those employed at an entity, such as a corporation, that interact with server 102 which processes requests issued by tenants 101.

Server 102, as used herein, is configured to host resources, such as applications, that process messages (e.g., requests) provided by tenants 101. Such messages may correspond to requests received by tenants 101 from their customers to be processed by one of the applications hosted by server 102. In one embodiment, a single instance of such applications may service multiple tenants 101 thereby efficiently utilizing resources. A description of the hardware configuration of server 102 is provided below in connection with FIG. 2.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with environment 100 of FIG. 1 without departing from the scope of the present invention.

Environment 100 is not to be limited in scope to any one particular network architecture. Environment 100 may include any number of tenants 101, servers 102 and networks 103. For example, multi-tenant environment 100 may include multiple servers 102, such as a server farm, where a load balancer (not shown) is used to effectively distribute workloads across servers 102 in a manner that avoids overloading the resources of server 102.

Figure 2:
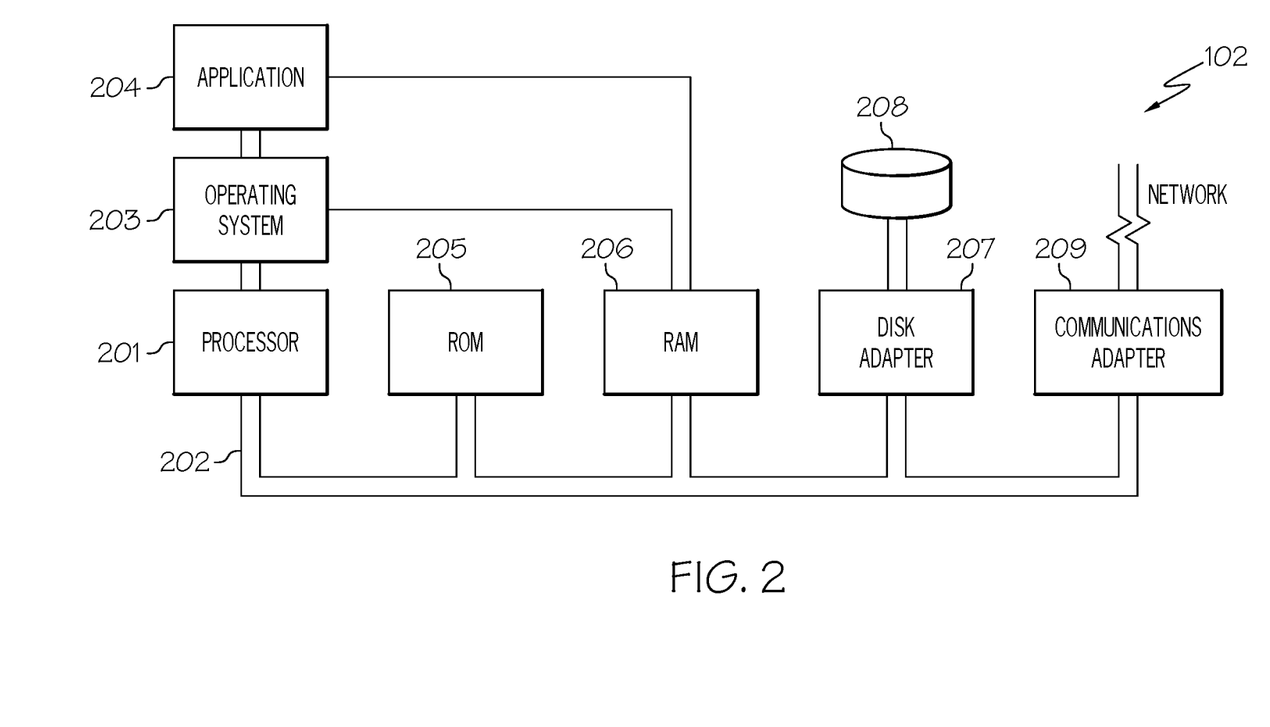
FIG. 2 illustrates an embodiment of the present invention of the hardware configuration of a server which is representative of a hardware environment for practicing the present invention.

Referring now to FIG. 2, FIG. 2 illustrates an embodiment of the present invention of the hardware configuration of server 102 (FIG. 1) which is representative of a hardware environment for practicing an embodiment of the present invention. Server 102 may have a processor 201 connected to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for safely processing integrated flows of messages in a multi-tenant container as discussed below in connection with FIGS. 3-6.

Referring again to FIG. 2, read-only memory ("ROM") 205 may be connected to system bus 202 and include a basic input/output system ("BIOS") that controls certain basic functions of server 102. Random access memory ("RAM") 206 and disk adapter 207 may also be connected to system bus 202. It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. It is noted that example embodiments of the program for safely processing integrated flows of messages in a multi-tenant container, as discussed below in connection with FIGS. 3-6, may reside in disk unit 208 or in application 204.

Server 102 may further include a communications adapter 209 connected to bus 202. Communications adapter 209 may interconnect bus 202 with an outside network (e.g., network 103 of FIG. 1) thereby allowing server 102 to communicate with tenants 101.

Embodiments of the present invention may be a system, a method, and/or a computer program product at any possible technical detail level of integration. The computer program product may include a computer readable storage medium (or media) having computer readable program instructions thereon for causing a processor to carry out aspects of the embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments of the present invention.

Aspects of the embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, it is currently challenging to enable the integration of flows of messages that allow the sharing of resources, such as containers, across multiple tenants while also being secure, such as by not affecting the other integrated flows of messages from other tenants.

Figure 3:
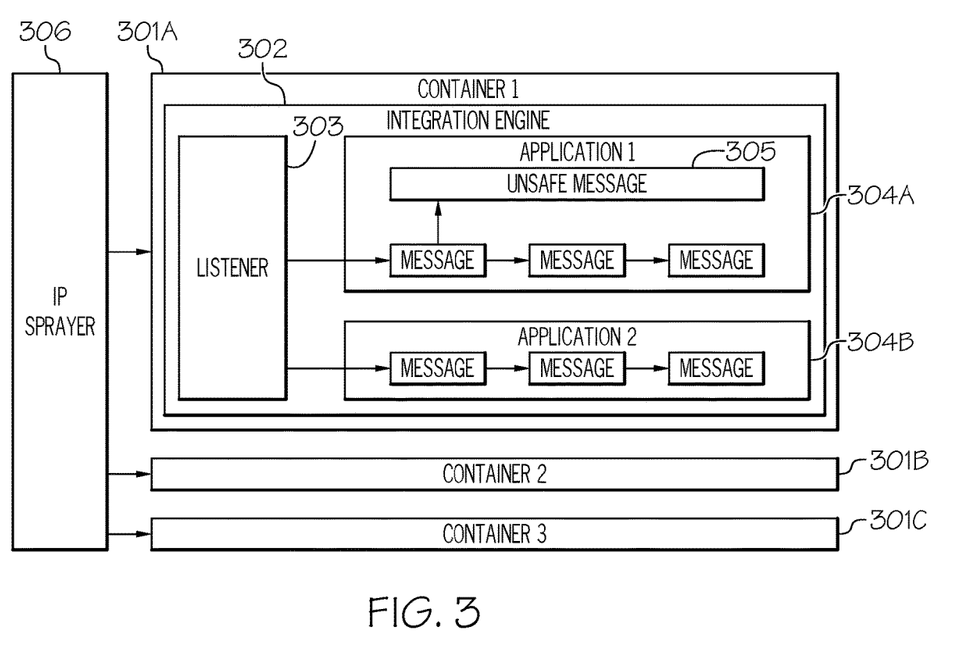
FIG. 3 is a diagram of the software components of the server used to safely process the integrated flows of messages in the multi-tenant environment in accordance with an embodiment of the present invention.
Figure 4:
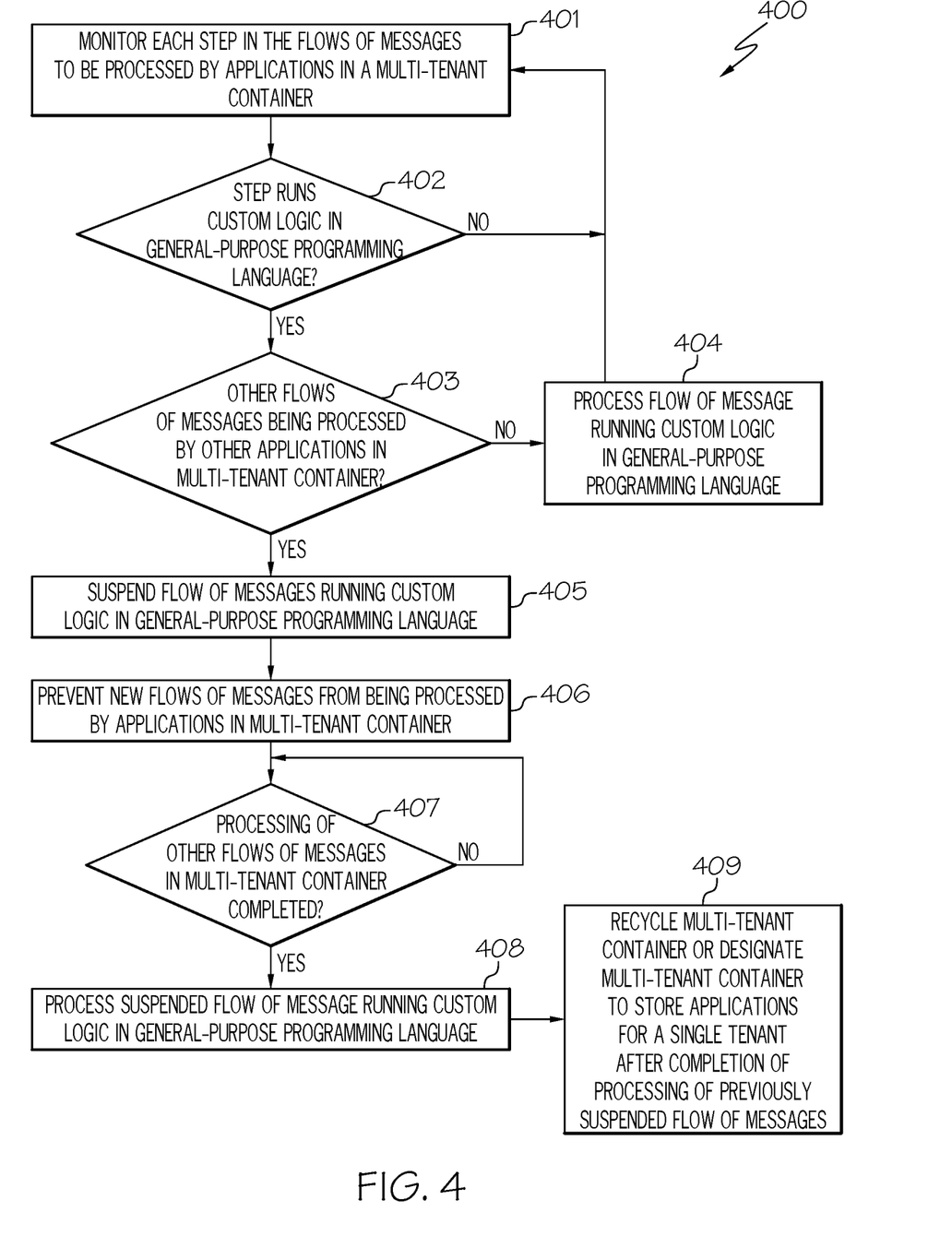
FIG. 4 is a flowchart of a method for safely processing the integrated flows of messages in a multi-tenant container in accordance with an embodiment of the present invention.
Figure 5:
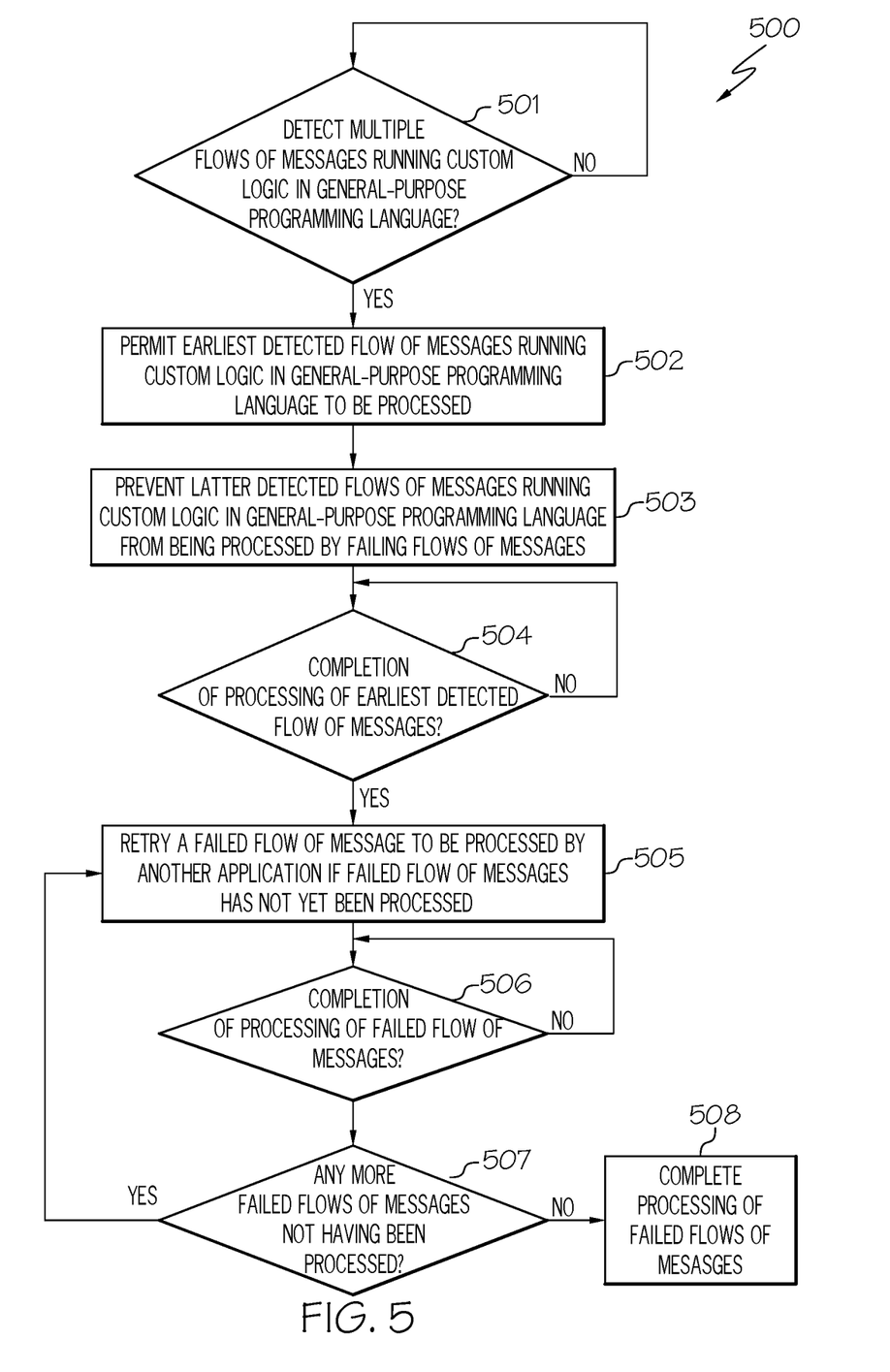
FIG. 5 is a flowchart of a method for processing multiple integrated flows of messages running custom logic in a general-purpose programming language in accordance with an embodiment of the present invention.
Figure 6:
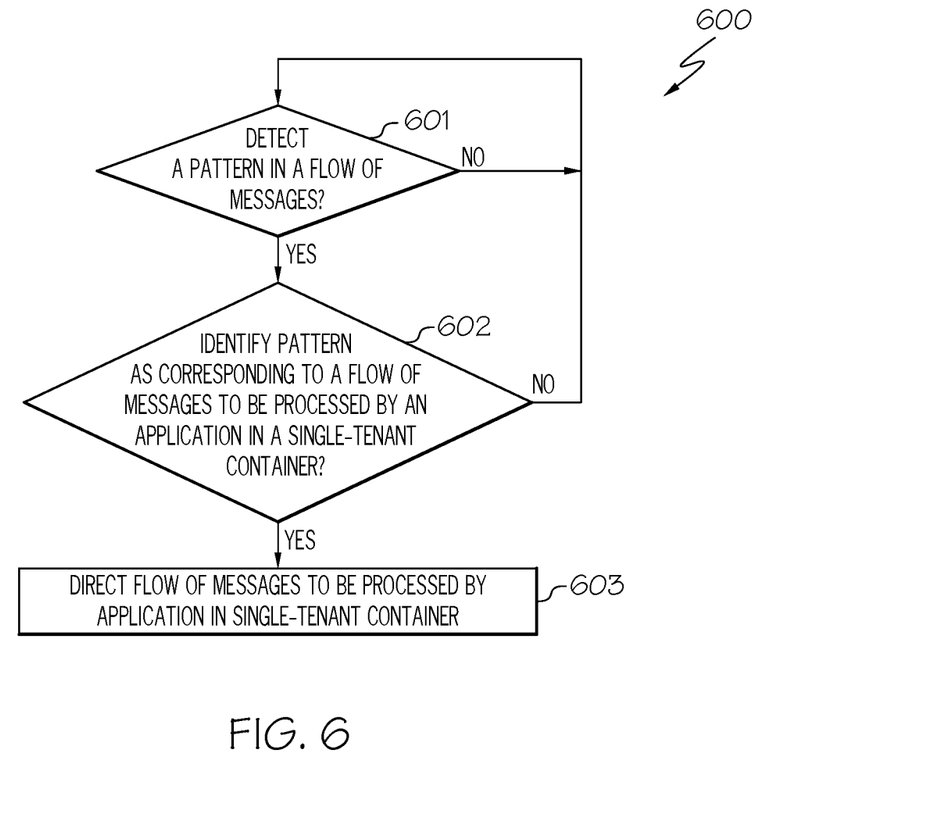
FIG. 6 is a flowchart of a method for directing a flow of messages to a container based on the pattern detected in the flow of messages in accordance with an embodiment of the present invention.

The embodiments of the present invention provide a means for safely processing the integrated flows of messages in a multi-tenant environment as discussed below in connection with FIGS. 3-6. FIG. 3 is a diagram of the software components of server 102 (FIGS. 1 and 2) used to safely process the integrated flows of messages in multi-tenant environment 100 (FIG. 1). FIG. 4 is a flowchart of a method for safely processing the integrated flows of messages in a multi-tenant container. FIG. 5 is a flowchart of a method for processing multiple integrated flows of messages running custom logic in a general-purpose programming language. FIG. 6 is a flowchart of a method for directing a flow of messages to a container based on the pattern detected in the flow of messages.

As stated above, FIG. 3 is a diagram of the software components of server 102 (FIGS. 1 and 2) used to safely process the integrated flows of messages in multi-tenant environment 100 (FIG. 1) in accordance with an embodiment of the present invention. In one embodiment, these software components may reside in application 204 (FIG. 2) of server 102. In one embodiment, these software components may reside in user space (memory area).

The following provides a brief description of these software components. A more detailed description of these software components (including their functionalities) is provided below in conjunction with FIGS. 4-6.

Referring to FIG. 3, in conjunction with FIGS. 1-2, server 102 includes containers 301A-301C (identified as "Container 1," "Container 2" and "Container 3," respectively). Containers 301A-301C may collectively or individually be referred to as containers 301 or container 301, respectively. While FIG. 3 illustrates three container 301, server 102 may utilize more (or fewer) containers 301. Furthermore, while the following description focuses on describing the features of container 301A, such description applies equally to the other containers 301. For example, the contents of containers 301B, 301C may include the same components as container 301A as shown in FIG. 3.

A "container 301," as used herein, refers to an isolated user-space instance used for storing applications to process flows of messages provided by tenants 101. Such containers 301 may be used to process flows of messages for multiple tenants ("multi-tenant container") or for a specified single tenant ("single-tenant container"). In connection with storing applications, container 301, such as container 301A, may also store an "integration engine" 302 (e.g., IBM® App Connect Enterprise). An "integration engine 302," as used herein, refers to a unit for processing integrated flows of messages from multiple tenants 101 by multiple applications within container 301. In one embodiment, such processing involves multi-tenant provisioning in which a single instance of such applications may service multiple tenants 101 thereby efficiently utilizing resources.

In one embodiment, integration engine 302, in connection with processing integrated flows of messages from multiple tenants, determines whether a flow of messages is running custom logic in a general-purpose programming language, and if so, stops such a flow of messages from being processed by the applicable application if there are other flows of messages being processed by other applications in the applicable container 301.

Furthermore, as shown in FIG. 3, integration engine 302 includes a software component, referred to herein as the "listener" 303, which is configured to route the flows of messages to be processed by the appropriate applications, such as applications 304A, 304B (identified as "Application 1" and "Application 2," respectively). While FIG. 3 illustrates container 301A storing two applications 304A, 304B, each container 301 may store more (or fewer) applications 304. Application 304, as used herein, refers to a program for processing flows of messages provided by different tenants 101.

Additionally, integration engine 302 is configured to monitor each step in the flow of messages to be processed by the applications. In particular, in one embodiment, integration engine 302 monitors each step in the flow of messages to be processed by the applications to determine if a step runs custom logic in a general-purpose programming language (e.g., Java®). A general-purpose programming language (also referred to as a "generic-application programming language"), as used herein, refers to a programming language commonly used in computer programming, such as Java®. In one embodiment, integration engine 302 determines if a step in the flow of messages is running custom logic in a general-purpose programming language by splitting that message into words. Integration engine 302 then compares the occurrences of these words with known snippets and computes the probability that the message is written in a particular programming language.

In one embodiment, integration engine 302 analyzes the steps in the flow of messages to identify custom logic, such as custom rules and algorithms, based on matching the words (previously split the message into words) to previously identified words as corresponding to custom logic.

In one embodiment, in response to integration engine 302 detecting a step running custom logic in a general-purpose programming language, integration engine 302 stops that flow of messages from being processed by application 304 if there are other flows of messages being processed by other applications 304 within container 301.

For example, referring to FIG. 3, integration engine 302 may detect an application 304 processing a flow of messages containing an unsafe message 305. "Unsafe message" 305, as used herein, refers to a message containing custom logic in a general-purpose programming language. That is, integration engine 302 detects a step running custom logic in a general-purpose programming language. Integration engine 302 then stops that flow of messages from being processed by application 304 (e.g., application 304A) if there are other flows of messages being processed by other applications 304 (e.g., application 304B) within container 301 (e.g., container 301A).

Once the other flows of messages have been processed by the other applications 304 within container 301 (e.g., container 301A), integration engine 302 then permits the flow of messages running custom logic in a general-purpose programming language to now be processed by the appropriate application 304. For example, once the other flows of messages have been processed by applications 304 (e.g., application 304B) within container 301, integration engine 302 permits the flow of messages running custom logic in a general-purpose programming language to now be processed by application 304 (e.g., application 304A) that originally received that flow of messages to be processed.

As discussed above, after detecting a flow of messages containing custom logic in a general-purpose programming language, integration engine 302 stops that flow of messages from being processed by application 304 if there are other flows of messages being processed by other applications 304 within container 301. Furthermore, in such a situation, a component, such an Internet Protocol (IP) sprayer 306, prevents new flows of messages from being processed by applications 304 in container 301 (e.g., container 301A) with the stopped flow of messages. In particular, IP sprayer 306 redirects traffic (new flows of messages) to other containers 301 (e.g., containers 301B, 301C).

A further description of these and other functionalities of server 102 will be provided below in connection with FIGS. 4-6.

As discussed above, FIG. 4 is a flowchart of a method 400 for safely processing the integrated flows of messages in multi-tenant container 301 (FIG. 3) in accordance with an embodiment of the present invention.

Referring now to FIG. 4, in conjunction with FIGS. 1-3, in step 401, integration engine 302 monitors each step in the flows of messages to be processed by applications 304 in a multi-tenant container 301. In one embodiment, such monitoring involves characterizing each step in the flow of messages as being either provided by integration engine 302 or running custom logic in a general-purpose programming language. When a step is characterized as being provided by integration engine 302, then the message associated with such a step is deemed to be a safe message. However, if a step is characterized as running custom logic in a general-purpose programming language, then the message associated with such a step is deemed to be an unsafe message 305. In one embodiment, integration engine 302 characterizes a step as running custom logic in a general-purpose programming language by detecting the running of untrusted generic code in container 301 by applications 304, such as detecting the execution of Java® Compute nodes, Embedded Structured Query Language (ESQL) Java® extensions, mapping nodes that utilize generic Java® code, etc.

In step 402, for each monitored step, integration engine 302 determines whether the monitored step runs custom logic in a general-purpose programming language.

If integration engine 302 determines that the monitored step does not run custom logic in a general-purpose programming language (such as characterizing the step as being provided by integration engine 302), then integration engine 302 continues to monitor each step in the flows of messages to be processed by applications 304 in multi-tenant container 301 in step 401.

If, however, integration engine 302 determines that the monitored step runs custom logic in a general-purpose programming language, then, in step 403, integration engine 302 determines whether there are other flows of messages being processed by other applications 304 in multi-tenant container 301 (e.g., container 301A).

If there are no other flows of messages being processed by other applications in multi-tenant container 301, then, in step 404, the appropriate application 304 (e.g., application 304A), that receives the message running the custom logic in the general-purpose programming language, processes the flow of messages running the custom logic in the general-purpose programming language.

Further, integration engine 302 continues to monitor each step in the flows of messages to be processed by applications 304 in multi-tenant container 301 in step 401.

If, however, there are other flows of messages being processed by other applications (e.g., application 304B) in multi-tenant container 301 (e.g., container 301A), then, in step 405, integration engine 302 suspends the flow of messages running the custom logic in the general-purpose programming language from being processed by application 304 (e.g., application 304A). Furthermore, integration engine 302 can allow the other flows of messages to be processed by the other applications 304 within multi-tenant container 301. In one embodiment, the flow of messages is suspended until the processing of the flows of messages running on behalf of the other tenants has been completed. In this manner, the risk of interference with other flows of messages is avoided.

Furthermore, in step 406, integration engine 302 prevents new flows of messages from being processed by applications 304 in multi-tenant container 301 (container 301 with application 304 receiving unsafe message 305 to process) (e.g., container 301A). In this manner, the risk of interference with other flows of messages is avoided. In one embodiment, new flows of messages are prevented from being processed by applications 304 in multi-tenant container 301 (e.g., container 301A) by having IP sprayer 306 redirect traffic (new flows of messages) to other containers 301 (e.g., container 301B).

For example, in one embodiment, IP sprayer 306 may correspond to a load balancer. In such an embodiment, new flows of messages are prevented from being processed by applications 304 in multi-tenant container 301 (e.g., container 301A) by having integration engine 302 invoke an external script to instruct the load balancer to redirect traffic away from container 301 (e.g., container 301A) to a different container 301 (e.g., container 301B). For example, the load balancer may be configured to effectively distribute workloads across containers 301 in a manner that avoids overloading the resources of a particular container 301 (e.g., container 301A). As a result, the load balancer may redirect traffic away from a container 301 with an application 304 receiving an unsafe message 305 to process to a different container 301.

In another example, in one embodiment, IP sprayer 306 may correspond to an inbound connector. In one embodiment, new flows of messages are prevented from being processed by applications 304 in multi-tenant container 301 by switching the inbound connector, such as a HyperText Transfer Protocol (HTTP) inbound connector.

In step 407, integration engine 302 determines whether the processing of the other flows of messages by applications 304 in multi-tenant container 301 (e.g., container 301A) is completed.

If the processing of the other flows of messages by applications 304 in multi-tenant container 301 (e.g., container 301A) has not been completed, then integration engine 302 continues to determine whether the processing of the other flows of messages by applications 304 in multi-tenant container 301 (e.g., container 301A) is completed in step 407.

If, however, the processing of the other flows of messages by applications 304 in multi-tenant container 301 (e.g., container 301A) has been completed, then, in step 408, integration engine 302 (application 304) processes the suspended flow of messages running custom logic in the general-purpose programming language. That is, the suspended flow of messages of step 405 is now unsuspended and processed by application 304 in multi-tenant container 301.

Upon completion of the processing of the flow of messages running the custom logic in the general-purpose programming language, in step 409, integration engine 302 recycles multi-tenant container 301 (e.g., container 301A) or designates multi-tenant container 301 (e.g., container 301A) to store applications 304 for a single tenant after processing the previously suspended flow of messages. In this manner, the risk of persistent threads or other contamination to affect subsequent flows is avoided.

Furthermore, in this manner, the vast majority of tenants are able to share containers until one flow of messages needs to run unsafe code thereby benefiting from the economics of scale that multi-tenant containers provide while only resorting to the more expensive per-tenant model when absolutely necessary.

While the foregoing discussion focused on the embodiment where a single flow of messages was attempting an unsafe operation in multi-tenant container 301, the present invention is not to be limited in scope to such an embodiment. For example, integration engine 302 may have to address the situation in which multiple flows of messages are attempting unsafe operations in the same container 301 as discussed below in connection with FIG. 5.

FIG. 5 is a flowchart of a method 500 for processing multiple integrated flows of messages running custom logic in a general-purpose programming language in accordance with an embodiment of the present invention.

Referring to FIG. 5, in conjunction with FIGS. 1-4, in step 501, a determination is made by integration engine 302 as to whether it detects multiple flows of messages running custom logic in a general-purpose programming language. As previously discussed, each step of the flows of messages is characterized as being either provided by integration engine 302 or running custom logic in a general-purpose programming language. When a step is characterized as being provided by integration engine 302, then the message associated with such a step is deemed to be a safe message. However, if a step is characterized as running custom logic in a general-purpose programming language, then the message associated with such a step is deemed to be an unsafe message 305. In one embodiment, integration engine 302 characterizes a step as running custom logic in a general-purpose programming language by detecting the running of untrusted generic code in container 301 by applications 304, such as detecting the execution of Java® Compute nodes, Embedded Structured Query Language (ESQL) Java® extensions, mapping nodes that utilize generic Java® code, etc.

If integration engine 302 does not detect multiple flows of messages running custom logic in a general-purpose programming language, then integration engine 302 continues to determine whether it detects multiple flows of messages running custom logic in a general-purpose programming language in step 501.

If, however, integration engine 302 detects multiple flows of messages running custom logic in a general-purpose programming language, then, in step 502, integration engine 302 permits the earliest detected flow of messages running custom logic in a general-purpose programming language to be processed by the application 304 that received that flow of messages with the untrusted generic code (e.g., unsafe message 305). For example, if integration engine 302 detects the flows of messages being processed by applications 304A, 304B as both running custom logic in a general-purpose programming language, and the flow of messages being processed by application 304A is the earlier detected flow of messages running custom logic in a general-purpose programming language, then integration engine 302 would permit the processing of the flow of messages by application 304A and prevent the processing of the flow of messages by application 304B as discussed below.

Furthermore, in step 503, integration engine 302 prevents the latter detected flows of messages running custom logic in a general-purpose programming language from being processed by failing those flows of messages. For example, in one embodiment, integration engine 302 returns an error for processing such latter detected flows of messages.

In step 504, a determination is made by integration engine 302 as to whether the processing of the earliest detected flow of messages running custom logic in a general-purpose programming language is completed.

If the processing of the earliest detected flow of messages running custom logic in a general-purpose programming language is not completed, then integration engine 302 continues to determine whether the processing of the earliest detected flow of messages running custom logic in a general-purpose programming language is completed in step 504.

If, however, the processing of the earliest detected flow of messages running custom logic in a general-purpose programming language is completed, then, in step 505, integration engine 302 retries a failed flow of messages to be processed by another application 304 if the failed flow of messages has not yet been processed. For example, if a flow of messages running custom logic in a general-purpose programming language was previously failed, such as the flow of messages being processed by application 304B, then such a flow of messages is retried to be processed by application 304B.

In one embodiment, a failed flow of messages is retried if no persistent operations have been completed, such as having no Representational State Transfer (REST) Application Programing Interface (API) calls succeeding, no database updates being made, etc.

In one embodiment, if there are multiple failed flows of messages, then integration engine 302 retries the earliest detected flow of messages running custom logic in a general-purpose programming language.

In step 506, a determination is made by integration engine 302 as to whether the processing of the failed flow of messages is completed.

If the processing of the failed flow of messages is not completed, then integration engine 302 continues to determine whether the processing of the failed flow of messages is completed in step 506.

If, however, the processing of the failed flow of messages is completed, then, in step 507, a determination is made by integration engine 302 as to whether there are any more failed flows of messages that have not been processed.

If there are no more failed flows of messages that have not been processed, then the processing of the failed flows of messages is completed in step 508.

If, however, there are more failed flows of messages that have not been processed, then integration engine 302 retries another failed flow of messages to be processed by another application 304 in step 505.

In addition to detecting multiple flows of messages running custom logic in a general-purpose programming language, integration engine 302 may direct a flow of messages to a container 301 based on the pattern detected in the flow of messages as discussed below in connection with FIG. 6.

FIG. 6 is a flowchart of a method 600 for directing a flow of messages to a container 301 (FIG. 3) based on the pattern detected in the flow of messages in accordance with an embodiment of the present invention.

Referring to FIG. 6, in conjunction with FIGS. 1-5, in step 601, a determination is made by integration engine 302 as to whether a pattern in the flow of messages is detected. A pattern, as used herein, refers to message flow scenarios. For example, each pattern has values, commonly referred to as pattern parameter values. For example, a pattern parameter value may be a queue name from where the messages are read. Other examples include the names of files, headers, attributes, message formats, types of arguments, functions, etc. utilized in the messages. In one embodiment, such information may be obtained from integration engine 302 by performing text analysis of the messages using natural language processing. Such analyzed text is then classified to a particular pattern parameter value using a classifier, which may be pre-trained to classify particular text to a corresponding pattern parameter value.

After the pattern parameter values are configured, a pattern instance project is generated, which contains references to all other projects in the workspace that relates to the pattern instance. In one embodiment, the pattern instance project also contains a pattern instance configuration file that stores the pattern parameter values associated with each of the patterns. Such a configuration file may store the configured pattern parameter values. In one embodiment, such a configuration file is stored in a storage device of server 102 (e.g., memory 205, disk unit 208).

In one embodiment, upon receiving a flow of messages to be processed by an application 304 in container 301, integration engine 302 may determine whether a pattern in the flow of messages is detected based on identifying pattern parameter values and determining whether such pattern parameters values match the pattern parameters values associated with a pattern that is stored in the configuration file. In one embodiment, integration engine 302 analyzes the data of the messages to determine its pattern parameter values, such as by using a message flow debugger in the IBM® Integration Toolkit. Once such pattern parameters values are obtained, integration engine 302 can determine whether such pattern parameters values match the pattern parameters values associated with a pattern that is stored in the configuration file as discussed above.

If a pattern in the flow of messages is not detected, then integration engine 302 continues to determine whether a pattern in the flow of messages is detected in step 601.

If, however, a pattern in the flow of messages is detected, then, in step 602, a determination is made by integration engine 302 as to whether the identified pattern corresponds to a flow of messages to be processed by an application 304 in a single-tenant container 301. In one embodiment, the patterns (including their associated pattern parameter values) stored in the configuration file discussed above may be associated with a container 301, such as a container 301 used only by a single tenant. In one embodiment, such information is stored in the configuration file. A container 301 that is designated to be used only by a single tenant is referred to herein as a "single-tenant" container 301.

For example, if integration engine 302 detects a pattern in the flow of messages that matches a pattern stored in the configuration file, then integration engine 302 determines from the configuration file whether there is a single-tenant container 301 associated with such a pattern. If there is a single-tenant container 301 associated with such a pattern, then integration engine 302 directs that flow of messages to be processed by an application 304 in such a single-tenant container 301 as discussed further below.

If the identified pattern does not correspond to a flow of messages to be processed by an application 304 in a single-tenant container 301, then integration engine 302 continues to determine whether a pattern in the flow of messages is detected in step 601.

If, however, the identified pattern corresponds to a flow of messages to be processed by an application 304 in a single-tenant container 301, then, in step 603, integration engine 302 directs the flow of messages to be processed by application 304 in a single-tenant container 301. In this manner, the flows of messages requiring single-tenant containers can be directed to such containers thereby preventing the risk of interference of such flows of messages.

Alternatively, in one embodiment, instead of directing the flow of messages to a single-tenant container 301, integration engine 302 may alert the tenant to the need for such isolation.

Embodiments of the present invention may improve the technology or technical field involving multi-tenant provisioning. As discussed above, multi-tenant environments involve multiple tenants (e.g., groups of users) being serviced by a single instance of software running on a server. With a multi-tenant architecture, a software application is designed to provide every tenant a dedicated share of the instance—including its data, configuration, user management, tenant individual functionality and non-functional properties. As a result, the resources being utilized by the tenants may be shared across the tenants. For example, the same resources may be utilized by multiple different tenants, which is commonly referred to as "multi-tenant provisioning." That is, "multi-tenant provisioning" refers to the allocation of resources to be shared among different tenants. In connection with multi-tenant provisioning, the flows of messages to be processed on behalf of different tenants may be processed by an application within the same container. Such flows of messages are said to be "integrated" since they are to be processed by an application within the same container. A "container," as used herein, refers to an isolated user-space instance. For example, operating system-level virtualization is an operating system paradigm in which the kernel allows the existence of multiple isolated user-space instances, where such instances are called "containers." By processing different flows of messages on behalf of different tenants within the same container, there may result an untoward influence on the processing of another flow of messages for a different tenant. For example, in multi-tenant environments, complicated logic may be required to handle special cases, such as error handling, involving custom logic in a general-purpose programming language (e.g., code written in Java®). For example, in error handling, custom compensation or recovery logic often requires general-purpose programming language support. Unfortunately, such general-purpose programming languages can be potentially misused to spy upon or otherwise influence unrelated integrated flows of messages involving different tenants. Currently, such situations can only be avoided by utilizing a different container for each tenant. However, while such a structure is secure, it does not allow the sharing of resources across a large set of tenants, and therefore, is expensive to implement. Alternatively, some multi-tenant environments prevent the use of general-purpose programming languages to address the situation described above. However, by preventing the use of such general-purpose programming languages, the multi-tenant environment may not meet the functional requirements of many tenants. As a result, there is not currently a means for enabling the integration of flows of messages that allow the sharing of resources, such as containers, across multiple tenants while also being secure, such as by not affecting the other integrated flows of messages from other tenants.

Embodiments of the present invention improve such technology by monitoring each step in the flows of messages to be processed by the applications in the multi-tenant container, where the multi-tenant container stores applications for processing the flows of messages for multiple tenants. Each step in the flow of messages is monitored to determine whether the step runs custom logic in a general-purpose programming language. If the monitored step is determined to run custom logic in a general-purpose programming language, then the flow of messages running custom logic in the general-purpose programming language is suspended from being processed by the application in the multi-tenant container if there are other flows of messages being processed by other applications in the multi-tenant container. Furthermore, new flows of messages are prevented from being processed by the applications in the multi-tenant container. After processing the other flows of messages by the other applications in the multi-tenant container, the suspended flow of messages is processed by the application in the multi-tenant container. In this manner, the flows of messages from different tenants are integrated so as to allow the sharing of resources, such as a container, while also being secure, such as by not affecting the other integrated flows of messages from other tenants. Furthermore, in this manner, there is an improvement in the technical field of multi-tenant provisioning.

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
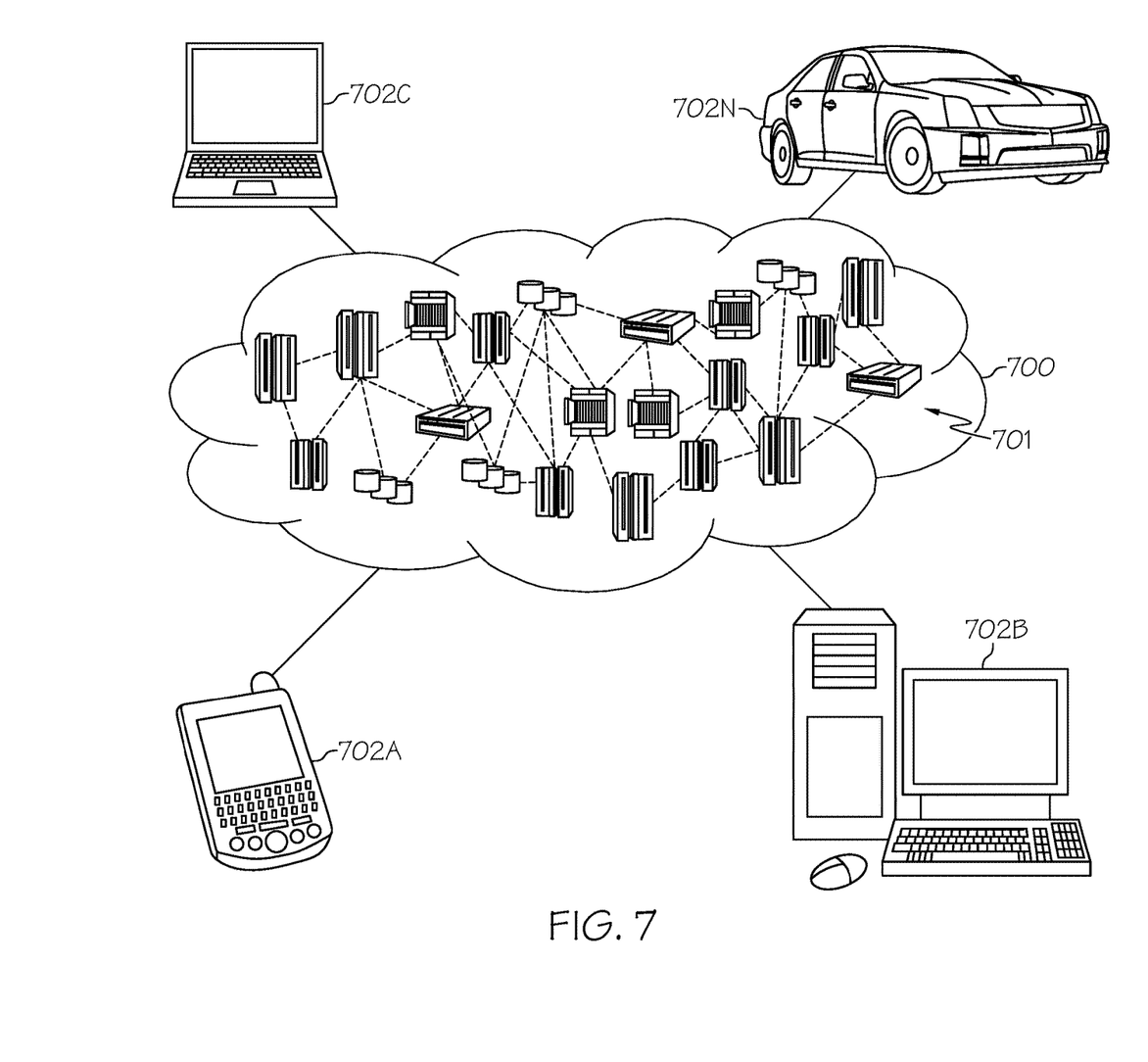
FIG. 7 depicts one embodiment of a cloud computing environment, which may implement, or be used in association with one or more aspects of the present invention.

Referring now to FIG. 7, illustrative cloud computing environment 700 is depicted. As shown, cloud computing environment 700 includes one or more cloud computing nodes 701 with which local computing devices used by cloud consumers, such as, for example, personal digital assistant (PDA) or cellular telephone 702A, desktop computer 702B, laptop computer 702C, and/or automobile computer system 702N may communicate. Nodes 701 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 702A-702N shown in FIG. 7 are intended to be illustrative only and that computing nodes 701 and cloud computing environment 700 can communicate with any type of computerized device over any type of network and/or network addressable connection (e.g., using a web browser).

Figure 8:
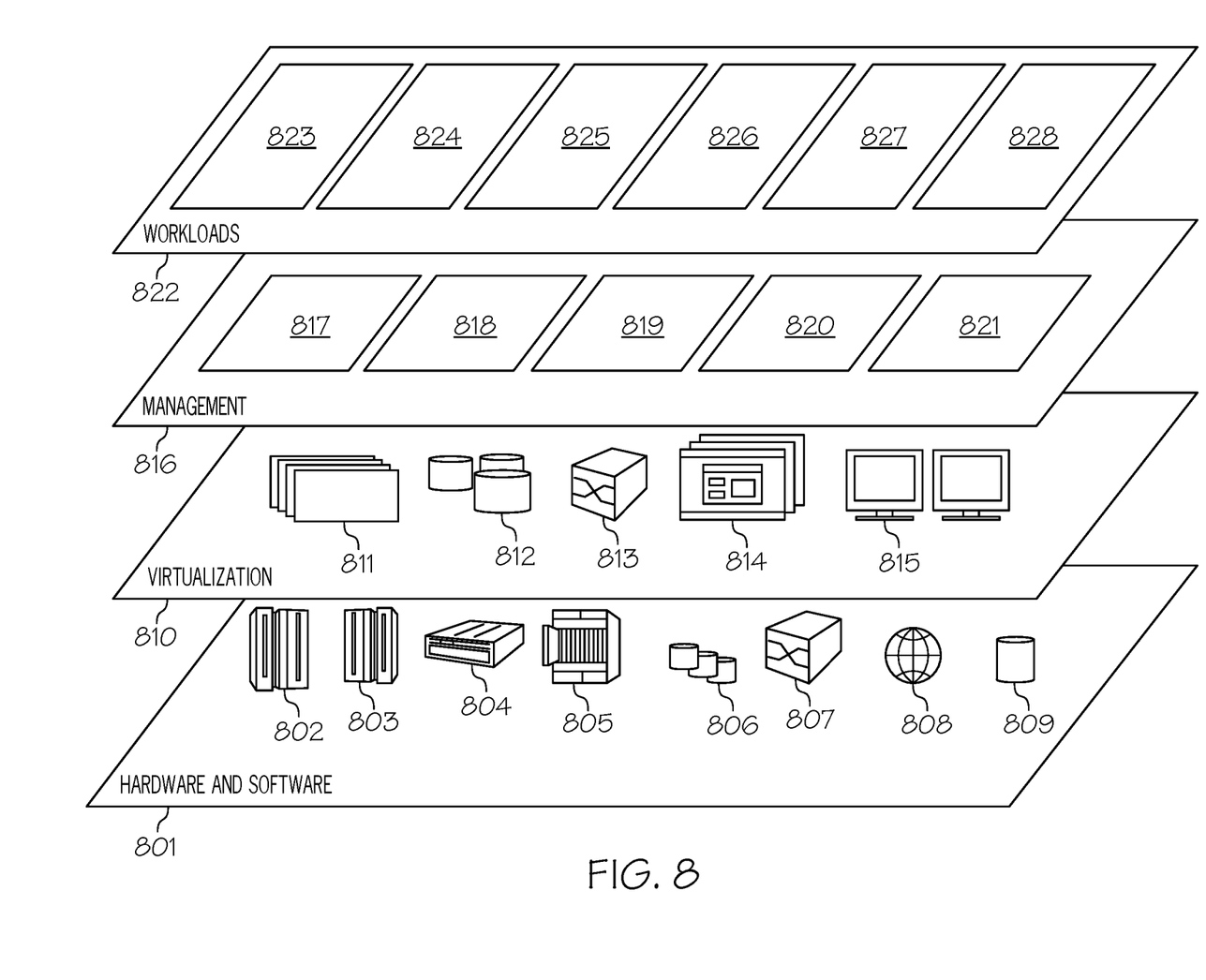
FIG. 8 depicts one example of extraction model layers, which may facilitate or implement a mapping process, in accordance with one or more aspects of the present invention.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 801 includes hardware and software components. Examples of hardware components include mainframes 802; RISC (Reduced Instruction Set Computer) architecture based servers 803; servers 804; blade servers 805; storage devices 806; and networks and networking components 807. In some embodiments, software components include network application server software 808 and database software 809.

Virtualization layer 810 provides an abstraction layer from which the following examples of virtual entities may be provided: virtual servers 811; virtual storage 812; virtual networks 813, including virtual private networks; virtual applications and operating systems 814; and virtual clients 815.

In one example, management layer 816 may provide the functions described below. Resource provisioning 817 provides dynamic procurement of computing resources and other resources that are utilized to perform tasks within the cloud computing environment. Metering and Pricing 818 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 819 provides access to the cloud computing environment for consumers and system administrators. Service level management 820 provides cloud computing resource allocation and management such that required service levels are met. Service Level Agreement (SLA) planning and fulfillment 821 provide pre-arrangement for, and procurement of, cloud computing resources for which a future requirement is anticipated in accordance with an SLA.

Workloads layer 822 provides examples of functionality for which the cloud computing environment may be utilized. Examples of workloads and functions which may be provided from this layer include: mapping and navigation 823; software development and lifecycle management 824; virtual classroom education delivery 825; data analytics processing 826; transaction processing 827; and processing integrated flows of messages in a multi-tenant container 828.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for safely processing integrated flows of messages in a multi-tenant container, the method comprising:
   determining whether each step in a plurality of flows of messages to be processed by a plurality of applications in said multi-tenant container runs custom logic in a general-purpose programming language;
   suspending a flow of messages from being processed by an application in said multi-tenant container in response to detecting said flow of messages running custom logic in said general-purpose programming language and in response to other flows of messages being processed by other applications in said multi-tenant container;
   processing said suspended flow of messages by said application in said multi-tenant container after processing of said other flows of messages by said other applications in said multi-tenant container; and
   recycling said multi-tenant container after completion of said processing of said suspended flow of messages by said application in said multi-tenant container.

2. The method as recited in claim 1 further comprising:
   designating said multi-tenant container to store applications for a single tenant after completion of said processing of said suspended flow of messages by said application in said multi-tenant container.

3. The method as recited in claim 1 further comprising:
   monitoring each step in said plurality of flows of messages to be processed by said plurality of applications in said multi-tenant container, wherein said multi-tenant container stores applications processing flows of messages for multiple tenants.

4. The method as recited in claim 1 further comprising:
   preventing new flows of messages to be processed by applications in said multi-tenant container in response to suspending said flow of messages from being processed by said application in said multi-tenant container.

5. The method as recited in claim 4, wherein said new flows of messages are prevented from being processed by applications in said multi-tenant container by switching off an in-bound connector or invoking an external script to instruct a load balancer to redirect traffic away from said multi-tenant container.

6. A computer program product for safely processing integrated flows of messages in a multi-tenant container, the computer program product comprising one or more computer readable storage mediums having program code embodied therewith, the program code comprising programming instructions executable by a processor for:
   determining whether each step in a plurality of flows of messages to be processed by a plurality of applications in said multi-tenant container runs custom logic in a general-purpose programming language;
   suspending a flow of messages from being processed by an application in said multi-tenant container in response to detecting said flow of messages running custom logic in said general-purpose programming language and in response to other flows of messages being processed by other applications in said multi-tenant container;
   processing said suspended flow of messages by said application in said multi-tenant container after processing of said other flows of messages by said other applications in said multi-tenant container; and
   recycling said multi-tenant container after completion of said processing of said suspended flow of messages by said application in said multi-tenant container.

7. The computer program product as recited in claim 6, wherein the program code further comprises the programming instructions executable by the processor for:
   designating said multi-tenant container to store applications for a single tenant after completion of said processing of said suspended flow of messages by said application in said multi-tenant container.

8. The computer program product as recited in claim 6, wherein the program code further comprises the programming instructions executable by the processor for:
   monitoring each step in said plurality of flows of messages to be processed by said plurality of applications in said multi-tenant container, wherein said multi-tenant container stores applications processing flows of messages for multiple tenants.

9. The computer program product as recited in claim 6, wherein the program code further comprises the programming instructions executable by the processor for:
   preventing new flows of messages to be processed by applications in said multi-tenant container in response to suspending said flow of messages from being processed by said application in said multi-tenant container.

10. The computer program product as recited in claim 9, wherein said new flows of messages are prevented from being processed by applications in said multi-tenant container by switching off an in-bound connector or invoking an external script to instruct a load balancer to redirect traffic away from said multi-tenant container.

11. A system, comprising:
   a memory for storing a computer program for safely processing integrated flows of messages in a multi-tenant container; and
   a processor connected to the memory, wherein the processor is configured to execute the program instructions of the computer program to perform operations comprising:
      determining whether each step in a plurality of flows of messages to be processed by a plurality of applications in said multi-tenant container runs custom logic in a general-purpose programming language;
      suspending a flow of messages from being processed by an application in said multi-tenant container in response to detecting said flow of messages running custom logic in said general-purpose programming language and in response to other flows of messages being processed by other applications in said multi-tenant container;
      processing said suspended flow of messages by said application in said multi-tenant container after processing of said other flows of messages by said other applications in said multi-tenant container; and
      recycling said multi-tenant container after completion of said processing of said suspended flow of messages by said application in said multi-tenant container.

12. The system as recited in claim 11, wherein the operations further comprise:
   designating said multi-tenant container to store applications for a single tenant after completion of said processing of said suspended flow of messages by said application in said multi-tenant container.

13. The system as recited in claim 11, wherein the operations further comprise:
   monitoring each step in said plurality of flows of messages to be processed by said plurality of applications in said multi-tenant container, wherein said multi-tenant container stores applications processing flows of messages for multiple tenants.

14. The system as recited in claim 11, wherein the operations further comprise:
   preventing new flows of messages to be processed by applications in said multi-tenant container in response to suspending said flow of messages from being processed by said application in said multi-tenant container.

* * * * *